Inventor
LEONARD O. CARLSEN
By
Attorney

Inventor
LEONARD O. CARLSEN

Patented Sept. 19, 1944

2,358,489

UNITED STATES PATENT OFFICE 2,358,489

GEAR-CUTTING TOOL

Leonard O. Carlsen, Rochester, N. Y., assignor to Gleason Works, Rochester, N. Y., a corporation of New York Application August 1, 1941, Serial No. 405,064

12 Claims. (Cl. 29—95)

The present invention relates to a method of and to a tool for cutting gears and particularly to a method of and tool for cutting fine-pitch straight bevel gears. The present application is confined to the new tool. The novel method of the present invention is covered in a divisional application, Serial No. 451,536, filed July 20, 1942.

Considerable metal has to be removed from the interdental spaces of gears of coarse pitch in order to produce the final finished tooth form. It is the practice, therefore, to rough-cut such gears to approximate shape before taking the finishing cut. In very fine pitch jobs, however, the amount of metal, that has to be removed in order to form the tooth spaces, is quite small. For reasons of economy, then, such gears may be cut from the solid in one operation without any preliminary roughing cut. With the tools and cutting methods heretofore employed, however, it has been difficult in a single cut or so-called "completing" operation to obtain an entirely smooth tooth surface finish, for the cutting edges which rough out the tooth space have also to finish the tooth sides. Furthermore, in the "completing" method, the tooth spacing sometimes does not have the required accuracy because the cutting thrusts are different on the two tools. Hence, where the requirements of finish and accuracy are high, it has been the practice heretofore to take separate roughing and finishing cuts on fine pitch jobs as well as on coarse pitch jobs.

One object of the invention is to provide a combined roughing and finishing tool for cutting gears in a reciprocatory planing operation which has separate roughing and finish cutting parts that are arranged to operate successively on a gear blank as the tool is reciprocated across the face of the blank.

Another object of the invention is to provide a combined roughing and finishing planing tool in which both the roughing and finishing parts may be sharpened with front rake so as to obtain very keen cutting action.

Still another object of the invention is to provide a combined roughing and finishing planing tool which is so constructed that the finishing part will cut on one side only of the tooth space so that when the finishing cut is being taken, there will be no other cutting thrusts on the tool to disturb the accuracy of the finishing operation.

Other objects of the invention will be apparent hereinafter from the specification and from the recital of the appended claims.

For completing gears by the method of the present invention, a pair of reciprocatory planing tools are employed. Each tool has a roughing part and a finishing part, and the roughing part is arranged in advance of the finishing part in the direction of reciprocation of the tool. In the preferred construction, the roughing part is sharpened to cut on one side of a tooth space and the finishing part of a tool is sharpened to cut on the opposite side of that tooth space. In the preferred construction, the finishing part is made to a greater actual height than the roughing part but its actual height is so selected with reference to the height of the roughing part that when the tool is tipped to the top clearance angle required for cutting, that is, when the tool is in actual cutting position, the finishing part will not project into the tooth space as far as the roughing part of the tool. Thus the roughing part of the tool will relieve the tip of the finishing part of the tool of all or of practically all cutting, and the finishing part will cut substantially on the side of a tooth space only.

As already stated, the tools are preferably sharpened so that the roughing and finishing parts of a tool will operate on opposite sides of a tooth space of the blank. Preferably the two tools are so sharpened and arranged that their finishing edges will operate, respectively, on the adjacent opposite sides of two adjacent tooth spaces of a blank while the roughing edges operate on the remotely spaced opposite sides of those same two tooth spaces. The finishing edges of the two tools, in other words, are preferably arranged to cut on opposite sides of the same tooth. On each cutting stroke of a tool, the roughing part of the tool engages the blank first and takes a cut in the bottom and on one side of a tooth slot. Then the finishing part takes its cut on the opposite side of the tooth slot. The two tools are stroked back and forth, cutting ever further into the blank with feed or roll until the tooth space is finished. Then the tools are withdrawn from engagement with the blank, and the blank is indexed. During the cutting of the first two tooth spaces of the blank, two slots are roughed out and the adjacent opposite sides of those slots, which bound a tooth, are finished. Thereafter, when the blank is indexed from tooth to tooth, one tooth slot is roughed and one side thereof finish-cut by one tool while the other tool taper-cuts and finishes the opposite side of a tooth slot which has previously been operated on by the first tool. As already stated, when the blank has been indexed through one revolution, the gear is completed.

The present invention may be practiced on any standard straight bevel gear cutting machine of the two tool type by simply substituting for the conventional type of planing tools, tools made according to the present invention.

Figure 1:
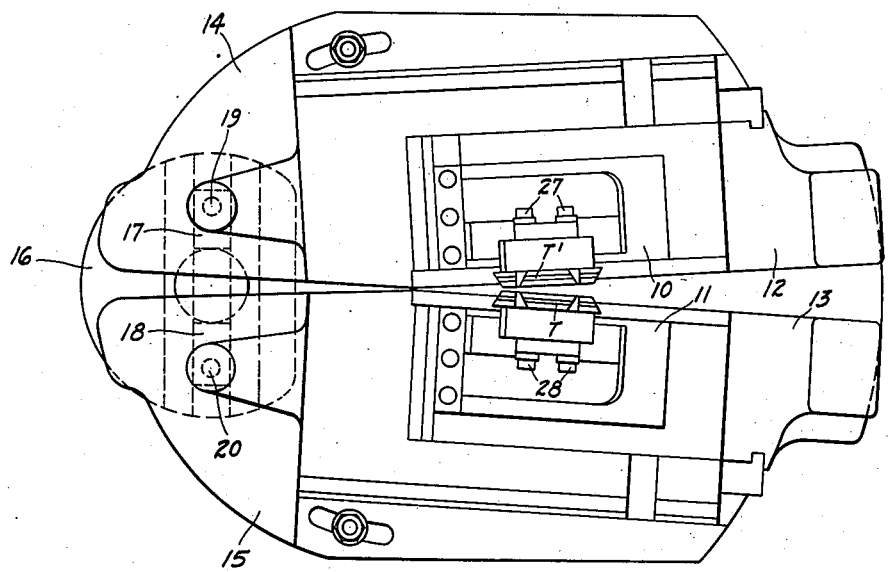
Fig. 1 is a front elevation of the tool end of a standard type two-tool straight bevel gear generator, showing a pair of planing tools made according to the present invention mounted thereon for practicing this invention.

As already stated, the process of the present invention may be practiced on any conventional type of two-tool straight bevel gear generator. In Fig. 1 I have shown the tool end of a machine of the type described in the Gleason et al. Patent No. 1,660,502 of February 28, 1928. The present invention may be practiced on the machine mentioned simply by securing tools T and T', which are made according to the present invention, to the tool boxes 10 and 11, respectively, of the machine. These tool boxes are pivotally mounted on tool slides 12 and 13, respectively, and the slides 12 and 13 are mounted for reciprocation on adjustable tool arms 14 and 15, respectively. The tool slides 12 and 13 are reciprocated, as described in the patent mentioned, by a crank driven mechanism which includes the oscillating plate 16, the blocks 17 and 18 which are slidable in the plate, and the pins 19 and 20, respectively, which connect the blocks with the tool slides 12 and 13, respectively. The tool arms 14 and 15 are adjustable angularly in accordance with the angle of longitudinal convergence of opposite sides of the teeth of the gear to be cut. Each tool cuts on the stroke of its slide in one direction and is out of cutting position on the return stroke of its slide, the pivotal tool boxes 10 and 11 being swung to and from cutting position at opposite ends of the stroke of their respective slides by the clapping mechanisms of the machine. The tool slides travel simultaneously in opposite directions under actuation of their crank driven reciprocating mechanism. Hence one tool will be cutting on the cutting stroke of its slide while the other tool is in withdrawn position on the return stroke of its slide.

Figure 2:
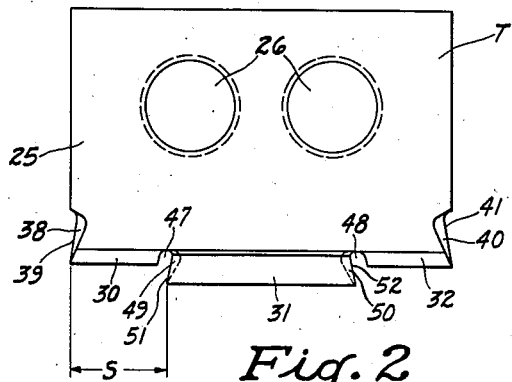
Fig. 2 is a plan view of a planing tool made according to the present invention.
Figure 3:
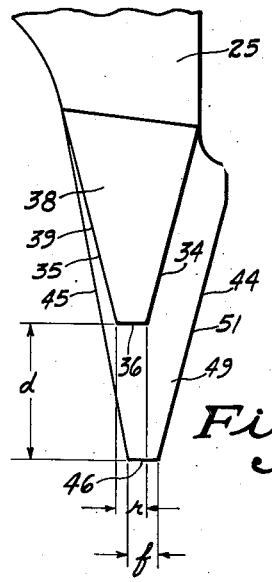
Fig. 3 is a fragmentary end elevational view of this tool on an enlarged scale.

One embodiment of the tool for practicing the present invention is shown in Figs. 2 and 3. The body portion of this tool is denoted at 25. It is provided with holes 26 through which screws 27 or 28 may be passed to secure the tool to one of the tool boxes 10 or 11 of the machine.

The cutting portion of the tool consists of three parts designated as 30, 31 and 32, respectively. 30 and 32 are rough-cutting parts, and 31 is a finish-cutting part. The two roughing parts are provided simply as a matter of economy so that a given tool may be used at will on either the upper or lower tool slide of a given gear-cutting machine, as will appear hereinafter. Only one roughing part 30 or 32 is operative in any given position of the tool.

The roughing parts 30 and 32 are similar. Each is of truncated wedge shape and has plane opposite side surfaces 34 and 35 and a plane tip surface 36. The front face 38 of the part 30 is sharpened with a hook and side rake to provide a side-cutting edge at the juncture of the front face 39 with the side 35 and a tip-cutting edge at the juncture of the tip face 36 with the front face 38. Similarly, the rear face 40 of the part 32 is sharpened with a hook and side rake to provide side and tip cutting edges at the junctures of the rear face 40 with one side and the tip of this part 32. The side-cutting edge 41 for the rear part 32 lies at the same side of the blade as the side cutting edge 39 of the front roughing part 30.

The finishing part is separated from the roughing parts 30 and 32 by grooves 47 and 48. It is also of truncated V-shape, having plane opposite sides 44 and 45 and a plane top surface 46. It has its two end faces 49 and 50 sharpened with hooks and side rakes to provide side-cutting edges 51 and 52, respectively.

The front and rear cutting faces 39 and 40 of the roughing parts 30 and 32, respectively, and the front and rear faces 49 and 50 of the finishing part 31 permit of using the same tool on either the upper or lower tool slides 10 or 11 by simply reversing the tool end for end. When the tool is positioned on the lower tool slide 13, the side-cutting edge 39 of the roughing part 30 and the side cutting edge 51 of the finishing part 31 are effective. When the tool is positioned on the upper slide 12, the side-cutting edge 41 of the roughing part 32 and the side cutting edge 52 of the finishing part 31 are effective.

The tool is so made that side-cutting edges 39 and 41 of its roughing parts are offset laterally beyond the corresponding side face 45 of the finish-cutting part 31. Likewise, the tool is so constructed that the side-cutting edges 51 and 52 of the finishing part 31 are offset laterally to the opposite side beyond the corresponding side-faces 34 of the roughing parts. This construction is illustrated clearly in Fig. 3 where $r$ denotes the width of the roughing part 30 at its tip and $f$ denotes the width of the finishing part 31 at its tip.

Figure 5:
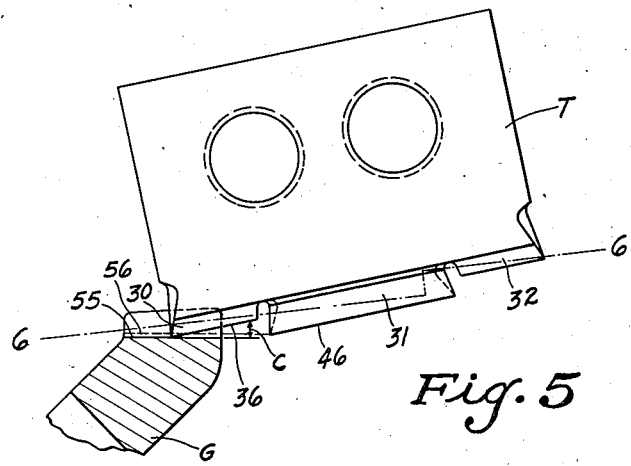
Fig. 5 is a fragmentary plan view and Fig. 6 is a fragmentary elevational view with the tool shown in section on the line 6—6 of Fig. 5, further illustrating the process of the present invention.

The finishing part 31 of a tool projects in height a distance $d$ beyond the tops 36 of the roughing parts 30 and 32, but when the tool is arranged in actual cutting position, its tip is inclined to the root plane of the work at an angle equal to the top clearance angle required for good cutting action. Thus, as shown in Fig. 5, the tool T is inclined to the root surface 55 of the gear G, that is to be cut, at a top clearance angle $c$. This angle is ordinarily 12°. To relieve the tip of the finishing part of cutting, the distance $d$ (Fig. 3) which the finishing part projects beyond the roughing part, is ordinarily made such that when the tool is in cutting position, the finishing part will not cut as deeply as the roughing part of the tool. This is shown in Fig. 5. As will be seen, while the tip of the roughing part 30, in full depth position, travels in the root plane 55 of the tooth space, the tip of the finishing part 31 travels on a line 56 which is parallel to the root plane but above the root plane. The distance $d$ of projection of the finishing part 31 beyond the roughing part 30 or 32 is equal to the distance $s$ (Fig. 2) from the front face of the roughing part to the front face of the finishing part times the tangent of the top clearance angle $c$ less ordinarily .002" (two thousandths of an inch). The .002" will usually provide sufficient clearance so that the tip of the finishing part of the tool will not rub on the bottom of the tooth space.

Figure 4:
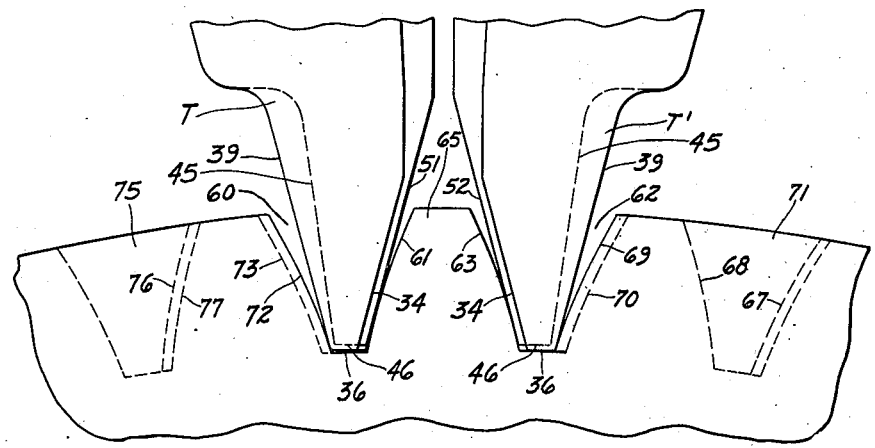
Fig. 4 is a diagrammatic view on an enlarged scale, showing a pair of the improved type of planing tools in engagement with a gear blank and illustrating the process of the present invention.
Figure 6:
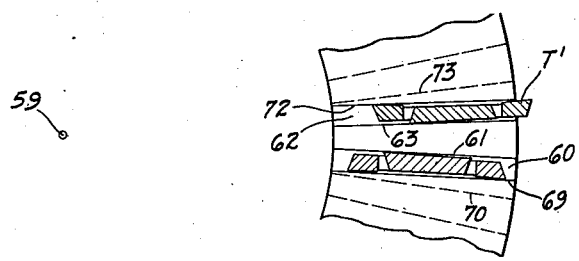

In the cutting operation, the two tools T and T' are reciprocated back and forth across the face of the gear blank in paths converging toward the cone apex 59 of the gear blank, during roll or feed of the tools into the work. In the preferred construction, the effective point-width of each tool, which is the distance between the finish-cutting edge 51 or 52 and the rough-cutting edge 39 or 41 measured in the plane of the tip of either the finishing or the roughing part, is less than the width of the two spaces of the gear to be cut at the small ends of said tooth spaces. As will be seen in Figs. 4 and 6, during cutting of the first two tooth spaces of a gear blank, then, the side edge 39 and the tip edge 36 of the roughing part 30 of the lower tool T and the side-cutting edge 51 of the finishing part 31 of this tool will cut a tooth slot 60 in the blank which has parallel sides, and which is of less width than the width of a finished tooth space. Further, one side 61 of this tooth space will be finished by the finish-cutting edge 51. Simultaneously, the side edge 39 and tip edge 36 of the roughing part 32 of the upper tool T' and the finished-cutting edge 52 of this tool T' will cut a tooth slot 62 which has parallel sides and which is also of less width than a finished tooth space. This tooth slot 62 is inclined to the slot 60 because the paths of travel of the two tools are inclined to one another. Thus two tooth slots 60 and 62 will be roughed out and the two sides 61 and 63 thereof, which bound the tooth 65 of the gear, will be finished.

After the tooth slots 60 and 62 have been cut to full depth, the tools are withdrawn from the blank and the blank indexed. If the indexing is in the direction of the arrow 66 (Fig. 4), then when the tools are fed back into engagement with the blank, the tool T will operate in the tooth slot 62 while the tool T' will operate in the tooth slot bounded by the dotted lines 67 and 68. Since the tool T travels on a path which is inclined longitudinally to the path of travel of the tool T', the finish cutting edge 51 of the tool T will remove the stock between the roughed side surface 69 of the tooth slot 62 and the finished side 70 thereof, producing the final finished tooth surface 70 and completing the finishing of the tooth slot. Simultaneously the tool T' will rough out the tooth slot 71 bounded by the sides 67 and 68 and will finish the side 68 of this tooth slot. Thus the operation will proceed. During each cutting cycle, the tool T' will rough out a slot and finish one side thereof, while the tool T will finish the opposite side of a tooth slot which has previously been operated upon by the tool T'. During the last cutting cycle, the finish side-cutting edge 52 of the tool T' will finish the tooth slot 60 of the blank, removing the stock between the roughed tooth surface 72 and the finished tooth side 73, producing the finished tooth side. Simultaneously the tool T will be removing the stock between the roughed side 76 and the finished side surface 77 of the tooth slot 75, which will previously have been roughed out and partly finished by the tool T'. Thus, when the blank has been indexed through a revolution, the gear will have been completed.

While the invention has been described in connection with a finish-cutting operation, it will be understood that it may also be used for rough-cutting, particularly on coarse pitch jobs. In this case, the different sections of the tool will all be roughing parts. A roughing tool so made will cut more smoothly and more rapidly than conventional planing tools because its cutting edges are sharper since opposite side rake is provided on the successive parts of the tool. In this case, the height of the central section 31 of the tool may be made such that it will be of the same effective cutting height as that of the front operating section of the tool, or the heights of the two parts may be unequal as in the illustrated embodiment of the invention.

Further, while the tool has been described as having three sections so as to be reversible, it will be understood that it may, if desired, be made simply with two sections and be used for its full effective life on either the upper or lower tool slide only.

Still further while the invention has been illustrated in connection with tools having straight side-cutting edges whose cutting parts are of prismatic form, having plane side and tip surfaces, it will be understood that the sides and cutting edges of the tool may be made to any shape usual or desirable in a gear planing tool. Moreover, while the cutting parts of the tool shown have unrelieved sides and tips, it will be understood that the tool may have its sides and tips relieved if desired. If the tips of the cutting parts are relieved, that is, are inclined to the base of the tool at the desired top cutting clearance angle, then of course, the tool need not be tilted and in this event, of course, if it is desired to have the tip cutting edge of the roughing part do the tip-cutting, the actual height of the finish-cutting part will be slightly less (.002" or so) than the actual height of the roughing part.

For cutting certain materials, such as phosphor bronze, the roughing or finishing part or both may be sharpened without side rake to get a scraping rather than a shaving action.

Further, while the tools shown have the roughing and finishing parts integral, it will be understood that these parts may be made separate from one another and that each tool may comprise separate roughing and finishing parts that are secured in a single tool holder.

Other modifications and uses of the invention will occur to those skilled in the art. The present application is intended to cover any adaptations, uses, or embodiments of the invention following, in general, the principles of the invention and including such departures from the present disclosure as come within known or customary practice in the gear art and as may be applied to the essential features hereinbefore set forth and as fall within the scope of the invention or the limits of the appended claims.

Having thus described my invention, what I claim is:

1. A reciprocatory planing tool for gear cutting having two cutting parts which are arranged one behind the other in the direction of cutting movement of the tool, each of said parts being of generally prismatic shape and having unrelieved side and tip surfaces, whereby the tool must be tilted in use so that its tip surface is inclined to the plane of cut to provide cutting clearance, the rear cutting part being of greater actual height than the front cutting part, the point of juncture of one side of the front cutting part with the tip of that cutting part being more offset and the point of juncture of the opposite side of the front cutting part with the tip of that cutting part being less offset from a median line of the tool than the points of juncture of opposite sides, respectively, of the rear cutting part with the tip of the latter cutting part.

2. A reciprocatory planing tool for gear cutting having two cutting parts which are arranged one behind the other in the direction of cutting movement of the tool, the rear cutting part being of greater actual height than the front cutting part, both parts being of generally prismatic shape and having sides and tips unrelieved, whereby the tool must be tilted in use so that its tip surface is inclined to the plane of cut to provide cutting clearance, the rear part projecting in height beyond the front part a distance less than the distance between the front faces of the two parts times the tangent of the angle to which the tool is tilted in use for top cutting clearance.

3. A reciprocatory planing tool for gear cutting having two cutting parts which are arranged one behind the other in the direction of cutting movement of the tool, both of said parts being of generally prismatic shape and having sides and tips unrelieved, whereby the tool must be tilted in use so that its tip surface is inclined to the plane of cut to provide cutting clearance, the rear cutting part being of greater actual height than the front cutting part but of less cutting height when the tool is tipped to the clearance angle, the front part being sharpened to have a side-cutting edge at one side and a tip cutting edge, and the rear part being sharpened to have a side-cutting edge at the side opposite to the side-cutting edge of the front part, the side cutting edge of each cutting part being more offset from a median line of the tool than the corresponding non-cutting side of the other cutting part.

4. A reciprocatory planing tool for gear cutting having a front, an intermediate, and a rear cutting part arranged one behind the other in the direction of cutting movement of the tool, the front cutting part being sharpened on its front face, the rear cutting part being sharpened on its rear face, and the intermediate cutting part being sharpened on both its front and rear faces so that the tool may be reversed end for end.

5. A reciprocatory planing tool for gear cutting having a front, an intermediate, and a rear cutting part arranged one behind the other in the direction of cutting movement of the tool, the front and rear cutting parts being of the same height but being of less actual height than the intermediate part, all of said parts being unrelieved, the front cutting part being sharpened on its front face, the rear cutting part being sharpened on its rear face, and the intermediate cutting part being sharpened on both its front and rear faces so that the tool may be reversed end for end.

6. A reciprocatory planing tool for gear cutting having a front, an intermediate, and a rear cutting part arranged one behind the other in the direction of cutting movement of the tool, the front cutting part being sharpened on its front face to have a side-cutting edge lying at one side of the tool, the rear cutting part being sharpened on its rear face to have a side-cutting edge lying at the same side of the tool as the side-cutting edge of the front part, and the intermediate part having one side face offset laterally with reference to the corresponding side face of the front and rear parts and being sharpened on both its front and rear faces to have front and rear side-cutting edges lying at the junctures of its front and rear faces with its offset side face.

7. A reciprocatory planing tool for gear cutting, having two cutting parts arranged one behind the other in the direction of cutting movement of the tool, each cutting part being of generally prismatic shape and having a plane tip surface and opposite side surfaces which are also plane and which converge toward the tip surface, said surfaces being unrelieved whereby the tool must be tilted in use so that its tip surface is inclined to the plane of cut to provide cutting clearance, said cutting parts being sharpened to have side cutting edges at opposite sides of the tool, respectively, the rear cutting part having greater actual height than the front cutting part but having a lesser effective cutting height, and the cutting edge of each part being offset outwardly, respectively, with reference to the corresponding non-cutting side of the other part.

8. A reciprocatory planing tool for gear cutting having two cutting parts arranged one behind the other in the direction of cutting movement of the tool, each cutting part being of generally prismatic shape and having opposite side surfaces which converge toward the tip surface of said part, said cutting parts being sharpened to have side cutting edges at opposite sides of the tool, respectively, the side cutting edge of each part being offset outwardly beyond the non-cutting side of the other part, the side and tip surfaces of each part being unrelieved, whereby the tool must be tilted in use so that its tip surface is inclined to the plane of cut to provide cutting clearance, the rear cutting part projecting in height beyond the front cutting part a distance slightly less than the longitudinal distance between the side cutting edges of the two parts times the tangent of the angle to which the tool is tilted for top cutting clearance in use.

9. A reciprocatory planing tool for gear cutting having a front, an intermediate, and a rear cutting part arranged one behind the other in the direction of cutting movement of the tool, the front cutting part being sharpened on its front face, the rear cutting part being sharpened on its rear face, the intermediate cutting part having one side face which is offset laterally with reference to the corresponding side of the front and rear cutting parts, and said intermediate cutting part having both its front and rear faces sharpened to provide side cutting edges at the junctures of its front and rear faces with its offset side face.

10. A reciprocatory planing tool for gear cutting having a front, an intermediate, and a rear cutting part arranged one behind the other in the direction of cutting movement of the tool, each of said parts being of generally prismatic shape and having its sides and tip unrelieved, the intermediate cutting part being of greater actual height than either the front or rear parts, the front cutting part being sharpened on its front face, the rear cutting part being sharpened on its rear face, the intermediate cutting part having one side face which is offset laterally with reference to the corresponding side of the front and rear cutting parts, and said intermediate cutting part having both its front and rear faces sharpened to provide side cutting edges at the junctures of said front and rear faces with its offset side face.

11. A reciprocatory gear-cutting tool having two cutting parts which are arranged, respectively, one behind the other in the direction of cutting movement of the tool, each of the cutting parts having opposite sides which converge to the tip of the cutting part and each of said parts having its sides and tip unrelieved whereby the tool must be tilted in use so that the tip surfaces of said parts are inclined to the plane of cut of the tool to provide cutting clearance, the points of juncture of opposite sides of the front cutting part with the tip of that cutting part being more and less offset, respectively, from a median line of the tool than the points of juncture of the opposite sides, respectively, of the rear cutting part with the tip of the rear cutting part, and the rear cutting part being of greater height.

12. A reciprocatory gear-cutting tool having two cutting parts which are arranged, respectively, one behind the other in the direction of cutting movement of the tool, each of the cutting parts having opposite sides which converge to its tip, both of said parts having sides and tips unrelieved whereby the tool must be tilted in use so that its tip surfaces are inclined to the plane of cut of the tool to provide cutting clearance, the front faces of the two cutting parts being sharpened in opposite directions to provide side cutting edges which lie, respectively, at opposite sides of the tool, the point of juncture of the side cutting edge of each cutting part with the tip of that cutting part being more offset from a median line of the tool than the corresponding non-cutting side of the other cutting part, the rear cutting part being of greater height than the front cutting part.

LEONARD O. CARLSEN.